United States Patent
Guo et al.

(10) Patent No.: US 12,204,202 B1
(45) Date of Patent: Jan. 21, 2025

(54) POLARIZERS, MANUFACTURING METHODS THEREOF, AND DISPLAY PANELS

(71) Applicant: TCL CHINA STAR OPTOELECTRONICS TECHNOLOGY CO., LTD., Shenzhen (CN)

(72) Inventors: Jiacong Guo, Shenzhen (CN); Ji Li, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/401,531

(22) Filed: Dec. 31, 2023

(30) Foreign Application Priority Data

Nov. 22, 2023 (CN) .......................... 202311568027.6

(51) Int. Cl.
*G02F 1/1335* (2006.01)
*G02B 5/30* (2006.01)
*G02F 1/13363* (2006.01)

(52) U.S. Cl.
CPC ..... *G02F 1/133531* (2021.01); *G02B 5/3016* (2013.01); *G02F 1/133633* (2021.01); *G02F 1/133635* (2021.01); *G02F 2202/043* (2013.01)

(58) Field of Classification Search
CPC ......... G02F 1/133528; G02F 1/133531; G02F 1/133633; G02F 1/133635; G02F 2202/043; G02B 5/3016
See application file for complete search history.

(56) References Cited

U.S. PATENT DOCUMENTS

| | | | | |
|---|---|---|---|---|
| 2020/0032058 | A1* | 1/2020 | Kuzmin | ............... C09D 177/10 |
| 2022/0397711 | A1* | 12/2022 | Smith | .................. G02B 5/3016 |

* cited by examiner

*Primary Examiner* — Paisley L Wilson
(74) *Attorney, Agent, or Firm* — The Roy Gross Law Firm, LLC; Roy Gross (57) ABSTRACT

Polarizers, manufacturing methods thereof, and display panels are provided. The polarizer includes a substrate having an integrated structure. The substrate includes a first part and a second part disposed on a side of the first part. The first part includes lyotropic liquid crystal molecules and is dispersed with a dichroic material. The second part includes lyotropic liquid crystal molecules without the dichroic material. The first part functions as a polarization part of the polarizer, and the second part functions as a compensation part of the polarizer.

17 Claims, 3 Drawing Sheets

Providing a carrier film layer, and forming a base material having an integrated structure by directionally coating on the carrier film layer, where the base material having the integrated structure includes lyotropic liquid crystal molecules — S01

Coating a dichroic material on a surface of the base material having the integrated structure, and controlling a dispersion time of the dichroic material to make the base material include a first part in which the dichroic material is dispersed and a second part in which the dichroic material is not dispersed — S02

POLARIZERS, MANUFACTURING METHODS THEREOF, AND DISPLAY PANELS

CROSS-REFERENCE TO RELATED APPLICATION

This application claims priority to Chinese Patent Application No. 202311568027.6, filed on Nov. 22, 2023, the disclosure of which is incorporated herein by reference in its entirety.

TECHNICAL FIELD

The present disclosure relates to the field of display technologies, and in particular, to polarizers, manufacturing methods thereof, and display panels.

BACKGROUND

With the development of display technology, liquid crystal display (LCD) devices and other flat display devices are widely used in mobile phones, televisions, personal digital assistants, digital cameras, notebook computers, desktop computers, and other consumer electronic products, and becoming the mainstream of display devices due to their advantages of high image quality, power saving, thin body, and wide application range.

In order to realize the display function of a liquid crystal display panel, polarizers need to be installed on both sides of the liquid crystal display panel. The polarizer includes a polarization part. Liquid crystal molecules in a vertical alignment (VA) liquid crystal display panel have birefringence characteristics, which requires an additional compensation part in the polarizer, and the compensation part and the polarization part need to be film-formed separately, resulting in a complicated manufacturing process and thick thickness of the polarizer.

SUMMARY

In view of above, polarizers are provided according to embodiments of the present disclosure. The polarizer includes a substrate being an integrated structure. The substrate includes a first part and a second part disposed on a side of the first part. The first part includes lyotropic liquid crystal molecules and is dispersed with a dichroic material. The second part includes lyotropic liquid crystal molecules without the dichroic material. The first part functions as a polarization part of the polarizer, and the second part functions as a compensation part of the polarizer.

Display panels are provided according to embodiments of the present disclosure. The display panel includes at least one polarizer as described in any one of the above. The display panel further includes an array substrate, a color filter substrate, and a liquid crystal layer disposed between the array substrate and the color filter substrate. Liquid crystal molecules of the liquid crystal layer have birefringence characteristics. The at least one polarizer includes a first polarizer disposed on a side of the array substrate facing away from the liquid crystal layer and/or a second polarizer disposed on a side of the color filter substrate facing away from the liquid crystal layer. The polarization part of the first polarizer is disposed on a side of the compensation part of the first polarizer facing away from the array substrate, and the polarization part of the second polarizer is disposed on a side of the compensation part of the second polarizer facing away from the color filter substrate.

Manufacturing methods of a polarizer are also provided according to embodiments of the present disclosure. The manufacturing method includes: directionally coating a substrate having an integrated structure on a carrier film layer, wherein the substrate having the integrated structure comprises lyotropic liquid crystal molecules; and coating a dichroic material on a surface of the substrate having the integrated structure in a dispersion time to make the substrate comprise a first part in which the dichroic material is dispersed and a second part in which the dichroic material is not dispersed. The first part is disposed on a side of the second part, the first part and the dichroic material form a polarization part of the polarizer, and the second part forms a compensation part of the polarizer.

BRIEF DESCRIPTION OF THE DRAWINGS

In order to explain the technical solutions in the embodiments of the present disclosure more clearly, the following will briefly introduce the drawings needed to describe the embodiments. Obviously, the drawings in the following description are only some embodiments of the present disclosure. For those skilled in the art, other drawings may be obtained based on these drawings without exerting creative efforts.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure. In addition, it should be understood that the specific embodiments described here are only used to illustrate and explain the invention, and are not used to limit the invention. In the present disclosure, unless otherwise specified, the orientational terms used such as "upper" and "lower" usually refer to the upper and lower positions of the device in actual use or working conditions, specifically the orientations in the drawings. The terms "Inside" and "outside" refer to the outline of the device.

The following disclosure provides many different embodiments or examples for implementing the various structures of the present disclosure. To simplify the disclosure of the present disclosure, the components and arrangements of specific examples are described below. Of course, they are merely examples and are not intended to limit the invention. Furthermore, the present disclosure may repeat reference numbers and/or reference letters in different examples, such repetition being for the purposes of simplicity and clarity and does not by itself indicate a relationship between the various embodiments and/or arrangements discussed. In addition, the present disclosure provides examples of various specific processes and materials, but one of ordinary skill in the art will recognize the application of other processes and/or the use of other materials. Detailed descriptions are provided below. It should be noted that the order of description of the following embodiments is not intended to limit the preferred order of the embodiments.

Embodiment 1

Figure 1:
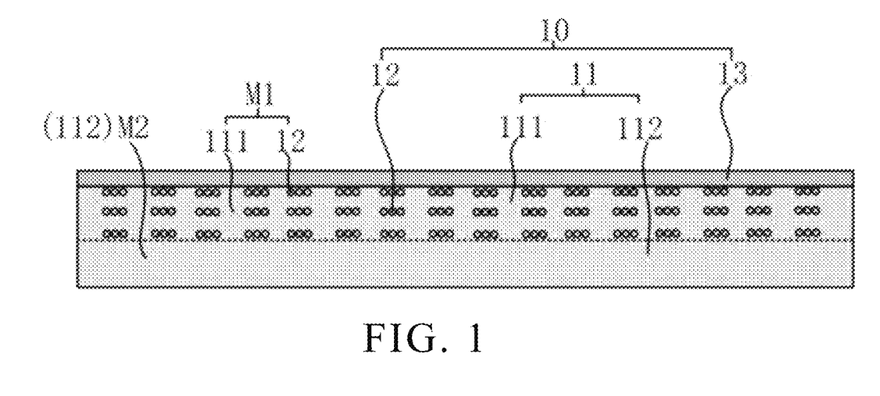
FIG. 1 is a schematic cross-sectional view of a polarizer provided in Embodiment 1 of the present disclosure.

FIG. 1 is a schematic cross-sectional view of a polarizer provided in Embodiment 1 of the present disclosure. Referring to FIG. 1, in a first aspect, Embodiment 1 of the present disclosure provides a polarizer 10.

In some embodiments of the present disclosure, the polarizer 10 includes a dichroic material 12 and a substrate 11 having an integrated structure. The substrate 11 having the integrated structure includes lyotropic liquid crystal molecules. A part of the substrate 11 in which the dichroic material 12 is dispersed is defined as a first part 111, and another part of the substrate 11 in which the dichroic material 12 is not dispersed is defined as a second part 112. The first part 111 is located on a side of the second part 112. The polarizer 10 includes a polarization part M1 and a compensation part M2. The first part 111 and the dichroic material 12 constitute the polarization part M1, and the second part 112 is the compensation part M2.

In the polarizer 10 provided by the embodiments of the present disclosure, since the substrate 11 includes lyotropic liquid crystal molecules, the substrate 11 itself has a compensation function, so that the second part 112 of the substrate 11 without the dichroic material 12 dispersed therein forms the compensation part M2. Since the dichroic material 12 is dispersed in the first part 111 of the substrate 11, the first part 111 and the dichroic material 12 form the polarization part M1. In addition, since the polarization part M1 corresponds to the first part 111 of the substrate 11, the compensation part M2 corresponds to the second part 112 of the substrate 11, and the first part 111 and the second part 112 are integrated, it can effectively avoid the problems of complicated manufacturing process and thick thickness of the polarizer 10 caused by the need for separate film formation of the polarization part M1 and the compensation part M2, thereby simplifying the manufacturing process of the polarizer 10 and reducing the thickness of the polarizer 10.

In the polarizer 10 provided in the embodiments of the present disclosure, the substrate 11 having the integrated structure may be formed by directional coating. The substrate 11 having the integrated structure is a lyotropic liquid crystal layer. The first part 111 and the second part 112 are parts of the lyotropic liquid crystal layer, and both include lyotropic liquid crystal molecules. Therefore, the first part 111 including lyotropic liquid crystal molecules and the second part 112 including lyotropic liquid crystal molecules may be formed by distributing a lyotropic liquid crystal layer by directional coating.

During the research, it is found that the lyotropic liquid crystal molecule excluding the dichroic material 12 is a single-optical-axis crystal with birefringence characteristics, transverse and longitudinal refractive indexes in a horizontal direction and a refractive index in a vertical direction of the lyotropic liquid crystal molecules may be adjusted by adjusting a coating mode of the material of the lyotropic liquid crystal molecules, so that the directionally coated lyotropic liquid crystal layer has a phase difference compensation function, that is, the compensation part M2 may be formed by the lyotropic liquid crystal layer excluding the dichroic material 12. In addition, it is also found that when the dichroic material 12 is coated on the lyotropic liquid crystal layer, the dichroic material 12 may disperse from the surface of the lyotropic liquid crystal layer to the interior of the layer and orientated after curing, so that the lyotropic liquid crystal layer containing the dichroic material 12 has a polarizing function, that is, the polarization part M1 may be formed by dispersing the dichroic material 12 in the lyotropic liquid crystal layer. in addition, it is unexpectedly discovered that when the dichroic material 12 is coated on the lyotropic liquid crystal layer and the dichroic material 12 disperses from the surface of the lyotropic liquid crystal layer to its interior, a dispersion depth of the dichroic material 12 is positively related to a dispersion time, and the dispersion time can be artificially controlled. In actual production, the dispersion depth of the dichroic material 12 may be accurately controlled by controlling the dispersion time. Therefore, by controlling the dispersion depth of the dichroic material 12, a lower part (that is, the second part 112 of the substrate 11) of the lyotropic liquid crystal layer that is controlled to exclude the dichroic material 12 dispersed therein serves as the compensation part M2 of the polarizer 10, and the upper part (that is, the first part 111 of the substrate 11) of the lyotropic liquid crystal layer that contains the dichroic material 12 dispersed therein serves as the polarization part M1 of the polarizer 10. Therefore, the substrate 11 may be integrally formed by a one-time coating process, and the compensation part M2 and the polarization part M1 may be formed by controlling the dispersion time of the dichroic material 12, which makes the manufacturing process of the polarizer 10 simpler and allows the polarizer 10 to have a lighter and thinner thickness.

In some embodiments of the present disclosure, an arrangement direction of the lyotropic liquid crystal molecules in the second part 112 is the same with an arrangement direction of the lyotropic liquid crystal molecules in the first part 111.

In the polarizer 10 provided by the present disclosure, since both the second part 112 and the first part 111 include lyotropic liquid crystal molecules, the substrate 11 including the second part 112 and the first part 111 can be formed by directionally coating a lyotropic liquid crystal layer through an integrated molding process. That is, the second part 112 and the first part 111 are formed in one directional coating process. Therefore, the lyotropic liquid crystal molecules in the second part 112 and the lyotropic liquid crystal molecules in the first part 111 are arranged in the same direction.

In some embodiments of the present disclosure, the dichroic material 12 includes iodide ions and complexes of iodide ions.

In the polarizer 10 provided by the present disclosure, when the dichroic material 12 is an iodine-based material including iodide ions and complexes of iodide ions, a dispersion speed of the dichroic material 12 in the lyotropic liquid crystal layer is more controllable, so that when the dichroic material 12 is dispersed in the lyotropic liquid crystal layer, the dispersion of the dichroic material 12 into the second part 112 as a result of the rapid dispersion rate may be avoided as much as possible. Therefore, it is easier for the polarizer 10 to form the compensation part M2 in which the dichroic material 12 is not dispersed and the polarization part M1 in which the dichroic material 12 is dispersed, which is beneficial to improving the production yield of the polarizer 10.

In some embodiments of the present disclosure, a sum of thicknesses of the second part 112 and the first part 111 is greater than or equal to 15 μm.

In the polarizer 10 provided by the present disclosure, the sum of the thicknesses of the second part 112 and the first part 111 is a total thickness of the lyotropic liquid crystal layer. When the dispersion speed of the dichroic material 12 in the lyotropic liquid crystal layer is fixed, the smaller the thickness of the lyotropic liquid crystal layer, the shorter the time for the dichroic material 12 to disperse from the top surface to the bottom of the lyotropic liquid crystal layer, which may easily result in the dispersion of the dichroic material 12 into the second portion 112, affecting the performance of the compensation part M2. In the present disclosure, by controlling the sum of the thicknesses of the second part 112 and the first part 111 to be greater than or equal to 15 μm, the time it takes for the dichroic material 12 to disperse from the top surface to the bottom of the lyotropic liquid crystal layer is controlled above a threshold range, so that when the dichroic material 12 is dispersed in the lyotropic liquid crystal layer, the dispersion of the dichroic material 12 into the second part 112 as a result of the rapid dispersion rate may be avoided as much as possible. Therefore, it is easier for the polarizer 10 to form the compensation part M2 in which the dichroic material 12 is not dispersed and the polarization part M1 in which the dichroic material 12 is dispersed, which is beneficial to improving the production yield of the polarizer 10.

In some embodiments of the present disclosure, a thickness of the first part 111 is greater than or equal to 7 μm, and a thickness of the second part 112 is greater than or equal to 0.5 μm.

In the polarizer 10 provided by the present disclosure, since the thickness of the first part 111 is greater than or equal to 7 μm, and the thickness of the second part 112 is greater than or equal to 0.5 μm, the dichroic material 12 in the first part 111 has a certain dispersion depth, which makes it easier to control the dispersion time of the dichroic material 12, improves the polarization effect of the polarization part M1, and prevents the problems of insufficient thickness and decreased compensation effect of the compensation part M2 caused by excessive thickness proportion and too deep diffusion depth of the first part 111 in the lyotropic liquid crystal layer.

Specifically, it is experimentally verified that the diffusion depth of the dichroic material 12 in the first part 111 increases with the extension of the dispersion time of the dichroic material 12. Taking the substrate 11 with a dry film thickness of 15 μm as an example: when the dispersion time of the dichroic material 12 is 20 seconds, the diffusion depth of the dichroic material 12 in the first part 111 is 7 μm, and the thickness of the first part 111 is 7 μm at this moment; when the dispersion time of the dichroic material 12 is 30 seconds, the diffusion depth of the dichroic material 12 in the first part 111 is 9 μm, and the thickness of the first part 111 is 9 μm at this moment; when the dispersion time of the dichroic material 12 is 40 seconds, the diffusion depth of the dichroic material 12 in the first part 111 is 10 μm, and the thickness of the first part 111 is 10 μm at this moment; when the dispersion time of the dichroic material 12 is 50 seconds, the diffusion depth of the dichroic material 12 in the first part 111 is 11 μm, and the thickness of the first part 111 is 11 μm at this moment; when the dispersion time of the dichroic material 12 is 60 seconds, the diffusion depth of the dichroic material 12 in the first part 111 is 12 μm, and the thickness of the first part 111 is 12 μm at this moment; when the dispersion time of the dichroic material 12 is 70 seconds, the diffusion depth of the dichroic material 12 in the first part 111 is 12.8 μm, and the thickness of the first part 111 is 12.8 μm at this moment; when the dispersion time of the dichroic material 12 is 80 seconds, the diffusion depth of the dichroic material 12 in the first part 111 is 13.5 μm, and the thickness of the first part 111 is 13.5 μm at this moment; when the dispersion time of the dichroic material 12 is 90 seconds, the diffusion depth of the dichroic material 12 in the first part 111 is 14 μm, and the thickness of the first part 111 is 14 μm at this moment; and when the dispersion time of the dichroic material 12 is 100 seconds, the diffusion depth of the dichroic material 12 in the first part 111 is 14.3 μm, and the thickness of the first part 111 is 14.3 μm at this moment.

In some embodiments of the present disclosure, the polarizer 10 includes a support layer 13 disposed on a side of the polarization part M1 facing away from the compensation part M2.

In the polarizer 10 provided in the present disclosure, the polarizer 10 includes only one support layer 13, and the support layer 13 is provided on the side of the polarization part M1 facing away from the compensation film, that is, there is no support layer provided on the side of the compensation part M2 facing away from the polarization part M1. Compared with the structure in the related art that requires support layers to be provided on opposite sides of the polarization part M1, the polarizer 10 in the present disclosure may be made to have a thinner thickness and a more simplified film layer structure, which may further reduce the production costs of the polarizer 10.

Specifically, the support layer 13 is configured to protect the polarizer 10, and a material of the support layer 13 is tri-cellulose acetate (TAC), polymethyl methacrylate (PMMA), or cyclic olefin polymer (COP). In the polarizer 10 provided by the present disclosure, since the substrate 11 including the second part 112 and the first part 111 can be formed by directional coating of a lyotropic liquid crystal layer, a carrier film layer of the lyotropic liquid crystal layer (substrate 11) may be directly used as a protective film layer of the polarizer 10, thereby eliminating one support layer 13 of the polarizer 10. When the carrier film layer is a substrate of the display panel, the substrate may be used as the protective film layer of the polarizer 10, so that while ensuring the operation stability of the polarizer 10, the polarizer 10 may be thinned, and the film structure of the polarizer 10 may be simplified.

In some embodiments of the present disclosure, a slow axis of the compensation part M2 is parallel or perpendicular to a light transmission axis of the polarization part M1.

In the polarizer 10 provided by the present disclosure, since the lyotropic liquid crystal molecules have birefringence characteristics, the lyotropic liquid crystal molecules in the second part 112 have fast axes and slow axes. In the present disclosure, the slow axis of the compensation part M2 is parallel or perpendicular to the transmission axis of the polarization part M1, which may ensure the compensation effect of the compensation part M2 under a large viewing angle.

In some embodiments of the present disclosure, in order to ensure the compensation effect of the compensation part M2 under the large viewing angle, a compensation value of the compensation part M2 meets the following requirements: 10 nm<Re<250 nm, 50 nm<Rth<400 nm, Re=(n1−n2)*d, and Rth=[(n1+n2)/2−n3]*d, where Re is a compensation value of the compensation part M2 in the horizontal direction parallel to the polarizer 10, Rth is a compensation value of the compensation part M2 in the vertical direction perpendicular to the polarizer 10, n1 is a transverse refractive index of the compensation part M2 in the horizontal direction, n2 is a longitudinal refractive index of the compensation part M2 in the horizontal direction, n3 is a refractive index of the compensation part M2 in the vertical direction, and d is a thickness of the compensation part M2 in the vertical direction.

Figure 2:
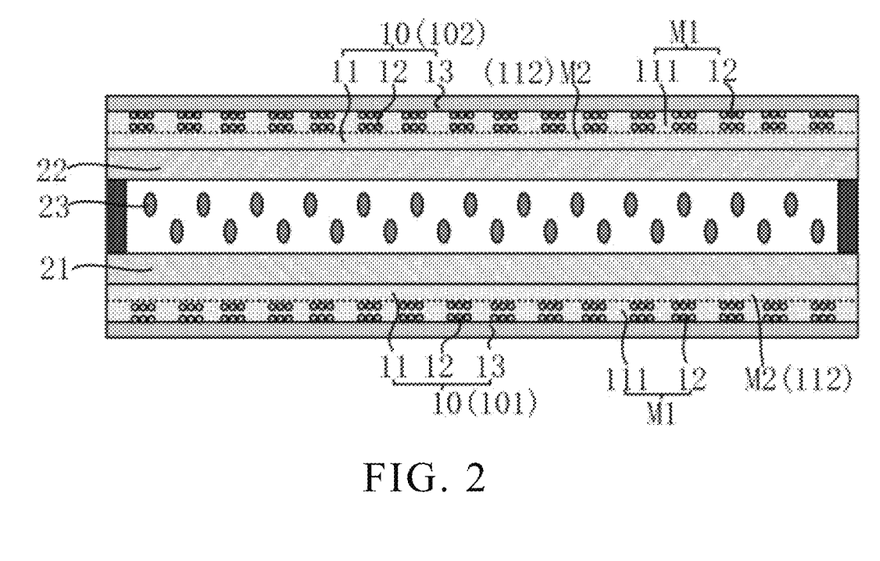
FIG. 2 is a schematic cross-sectional view of a display panel provided in Embodiment 1 of the present disclosure.

FIG. 2 is a schematic cross-sectional view of a display panel provided in Embodiment 1 of the present disclosure. Referring to FIG. 2, in a second aspect, Embodiment 1 of the present disclosure also provides a display panel. The display panel includes at least one polarizer 10 as described in any one of the above. The display panel further includes an array substrate 21, a color filter substrate 22, and a liquid crystal layer 23 disposed between the array substrate 21 and the color filter substrate 22. The liquid crystal molecules in the liquid crystal layer 23 have birefringence characteristics. The at least one polarizer 10 includes a first polarizer 101 disposed on a side of the array substrate 21 facing away from the liquid crystal layer 23 and/or a second polarizer 102 disposed on a side of the color filter substrate 22 facing away from the liquid crystal layer 23. The polarization part M1 of the first polarizer 101 is disposed on a side of the compensation part M2 of the first polarizer 101 facing away from the array substrate 21. The polarization part M1 of the second polarizer 102 is disposed on a side of the compensation part M2 of the second polarizer 102 facing away from the color filter substrate 22.

In the display panel provided by the present disclosure, the liquid crystal layer 23 disposed between the array substrate 21 and the color filter substrate 22 has birefringence characteristics. That there is no compensation part M2 in the polarizer 10 may seriously affect the display effect of the display panel, which is why the polarizer 10 provided in the present disclosure includes the compensation part M2. Optionally, the display panel is a vertically aligned liquid crystal display panel with good display effect at a large viewing angle. The array substrate 21 includes a pixel electrode, and the color filter substrate 22 includes a common electrode.

Referring to FIG. 2, in some embodiments of the present disclosure, the display panel includes the first polarizer 101 and the second polarizer 102. A slow axis of the compensation part M2 of the first polarizer 101 is perpendicular to a slow axis of the compensation part M2 of the second polarizer 102, a fast axis of the compensation part M2 of the first polarizer 101 is perpendicular to a fast axis of the compensation part M2 of the second polarizer 101, and a transmission axis of the polarization part M1 of the first polarizer 101 is perpendicular to a transmission axis of the polarization part M1 of the second polarizer 102.

In the display panel provided by the present disclosure, since the slow axis of the compensation part M2 of the first polarizer 101 is perpendicular to the slow axis of the compensation part M2 of the second polarizer 102, and the fast axis of the compensation part M2 of the first polarizer 101 is perpendicular to the fast axis of the compensation part M2 of the second polarizer 101, a display compatibility between the compensation part M2 of the first polarizer 101, the compensation part M2 of the second polarizer 102 and the vertically aligned liquid crystal display panel may be ensured. The transmission axis of the polarization part M1 of the first polarizer 101 is perpendicular to the transmission axis of the polarization part M1 of the second polarizer 102, so the polarization part M1 of the first polarizer 101 and the polarization part M1 of the second polarizer 102 have display compatibility with the vertically aligned liquid crystal display panel.

In other embodiments of the present disclosure, the display panel may include only the first polarizer 101 or only the second polarizer 102. When the display panel includes only the first polarizer 101 or the second polarizer 102, the display panel also includes a conventional polarizer disposed opposite to the first polarizer 101 or the second polarizer 102. A structure of the conventional polarizer is different from that of the first polarizer 101 or the second polarizer 102. In this case, the slow axis of the compensation part M2 of the first polarizer 101 is perpendicular to the transmission axis of the polarization part M1 of the first polarizer 101, or the slow axis of the compensation part M2 of the second polarizer 102 is perpendicular to the transmission axis of the polarization part M1 of the second polarizer 102.

In some embodiments of the present disclosure, the compensation part M2 of the first polarizer 101 is disposed on a surface of the array substrate 21 on the side facing away from the liquid crystal layer 23, so that the base of the array substrate 21 is used as the carrier film layer of the first polarizer 101, and the base of the array substrate 21 is used as the protective film layer of the compensation part M2 of the first polarizer 101, which avoids the problems of increasing the thickness and complicating the structure of the film layers of the first polarizer 101 caused by arranging an additional support layer 13 on the side of the compensation part M2 facing from the polarization part M1. Optionally, the base of the array substrate 21 may be a glass substrate.

In some embodiments of the present disclosure, the compensation part M2 of the second polarizer 102 is disposed on a surface of the color filter substrate 22 on the side facing away from the liquid crystal layer 23, so that the base of the color filter substrate is used as the carrier film layer of the second polarizer 102, and the base of the color filter substrate 22 is used as the protective film layer of the compensation part M2 of the second polarizer 102, which avoids the problems of increasing the thickness and complicating the structure of the film layers of the second polarizer 102 caused by arranging an additional support layer 13 on the side of the compensation part M2 facing from the polarization part M1. Optionally, the base of the color filter substrate 22 may be a glass substrate.

Figure 3:
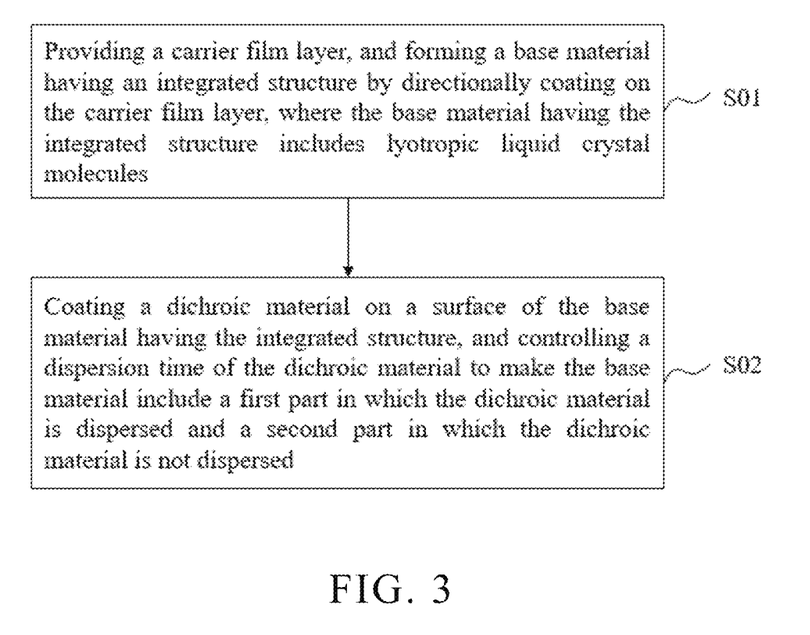
FIG. 3 is a schematic flowchart of a manufacturing method of a polarizer provided in Embodiment 1 of the present disclosure.

FIG. 3 is a schematic flowchart of a manufacturing method of a polarizer provided in Embodiment 1 of the present disclosure. Referring to FIGS. 1-3, in a third aspect, Embodiment 1 of the present disclosure also provides a manufacturing method used to manufacture the polarizer 10 described in any one of the above. The manufacturing method of the polarizer 10 includes a step S01 and a step S02.

The step S01 includes: providing a carrier film layer, and forming a substrate 11 having an integrated structure by directionally coating on the carrier film layer, where the substrate 11 having the integrated structure includes lyotropic liquid crystal molecules.

The step S02 includes: coating a dichroic material 12 on a surface of the substrate 11 having the integrated structure, and controlling a dispersion time of the dichroic material 12 to make the substrate 11 include a first part 111 in which the dichroic material 12 is dispersed and a second part 112 in which the dichroic material 12 is not dispersed.

The first part 111 is located on a side of the second part 112. The polarizer 10 includes a polarization part M1 and a compensation part M2. The first part 111 and the dichroic material 12 constitute the polarization part M1, and the second part 112 is the compensation part M2.

In the polarizer 10 manufactured by the manufacturing method in the present disclosure, since the dichroic material 12 is only dispersed in the first part 111 and not dispersed in the second part 112, the first part 111 and the dichroic material 12 dispersed in the first part 111 form the polarization part M1 of the polarizer 10, and the second part 112 forms the compensation part M2 of the polarizer 10. In addition, since the polarization part M1 corresponds to the first part 111 of the substrate 11, the compensation part M2 corresponds to the second part 112 of the substrate 11, and the first part 111 and the second part 112 are integrated, the manufacturing process of the polarizer 10 may be simplified and the thickness of the polarizer 10 may be reduced.

In addition, since the substrate 11 including the second part 112 and the first part 111 is integrally formed by directional coating of the lyotropic liquid crystal layer, the manufacturing efficiency of the polarizer 10 may be improved and the manufacturing costs of the polarizer 10 may be reduced. Furthermore, compared with conventional polarizers formed by roll-to-roll film technology in the related art, the polarizer 10 manufactured by the manufacturing method in the present disclosure is not limited by width and can therefore be applied in oversized display panels, such as display panels above 75 inches.

In some embodiments of the present disclosure, the dichroic material 12 includes iodide ions and complexes of iodide ions. A sum of thicknesses of the second part 112 and the first part 111 is greater than or equal to 15 μm, and the dispersion time of the dichroic material 12 ranges from 20 to 100 seconds.

In the present disclosure, the iodine-based dichroic material 12 that includes iodine ions and complexes of iodide ions and has a more controllable dispersion speed in the lyotropic liquid crystal layer is adopted, and the dispersion time of the iodine-based dichroic material 12 is controlled from 20 to 100 seconds, so that the formation of the second part 112 in which the iodine-based dichroic material 12 is not dispersed and the formation of the first part 111 in which the iodine-based dichroic material 12 is dispersed are enabled when the iodine-based dichroic material 12 is dispersed in the lyotropic liquid crystal layer having a thickness of 15 μm or more, which greatly improves the production yield of the polarizer 10.

In some embodiments of the present disclosure, a thickness of the first part 111 is greater than or equal to 7 μm, and a thickness of the second part 112 is greater than or equal to 0.5 μm.

In the polarizer 10 manufactured by the manufacturing method in the present disclosure, since the thickness of the first part 111 is greater than or equal to 7 μm, and the thickness of the second part 112 is greater than or equal to 0.5 μm, the dichroic material 12 in the first part 111 has a certain dispersion depth, which makes it easier to control the dispersion time of the dichroic material 12, improves the polarization effect of the polarization part M1, and prevents the problems of insufficient thickness and decreased compensation effect of the compensation part M2 caused by excessive thickness proportion and too deep diffusion depth of the first part 111 in the lyotropic liquid crystal layer.

Specifically, it is experimentally verified that the diffusion depth of the dichroic material 12 in the first part 111 increases with the extension of the dispersion time of the dichroic material 12. Taking the substrate 11 with a dry film thickness of 15 μm as an example: when the dispersion time of the dichroic material 12 is 20 seconds, the diffusion depth of the dichroic material 12 in the first part 111 is 7 μm, and the thickness of the first part 111 is 7 μm at this moment; when the dispersion time of the dichroic material 12 is 30 seconds, the diffusion depth of the dichroic material 12 in the first part 111 is 9 μm, and the thickness of the first part 111 is 9 μm at this moment; when the dispersion time of the dichroic material 12 is 40 seconds, the diffusion depth of the dichroic material 12 in the first part 111 is 10 μm, and the thickness of the first part 111 is 10 μm at this moment; when the dispersion time of the dichroic material 12 is 50 seconds, the diffusion depth of the dichroic material 12 in the first part 111 is 11 μm, and the thickness of the first part 111 is 11 μm at this moment; when the dispersion time of the dichroic material 12 is 60 seconds, the diffusion depth of the dichroic material 12 in the first part 111 is 12 μm, and the thickness of the first part 111 is 12 μm at this moment; when the dispersion time of the dichroic material 12 is 70 seconds, the diffusion depth of the dichroic material 12 in the first part 111 is 12.8 μm, and the thickness of the first part 111 is 12.8 μm at this moment; when the dispersion time of the dichroic material 12 is 80 seconds, the diffusion depth of the dichroic material 12 in the first part 111 is 13.5 μm, and the thickness of the first part 111 is 13.5 μm at this moment; when the dispersion time of the dichroic material 12 is 90 seconds, the diffusion depth of the dichroic material 12 in the first part 111 is 14 μm, and the thickness of the first part 111 is 14 μm at this moment; and when the dispersion time of the dichroic material 12 is 100 seconds, the diffusion depth of the dichroic material 12 in the first part 111 is 14.3 μm, and the thickness of the first part 111 is 14.3 μm at this moment.

In some embodiments of the present disclosure, the carrier film layer is a base of the array substrate 21 or a base of the color filter substrate 22.

In some embodiments of the present disclosure, a coating direction of the lyotropic liquid crystal layer is the same as a direction of a light absorption axis of the polarization part M1. Furthermore, during the process of manufacturing the first polarizer 101 and the second polarizer 102, an arrangement direction of the lyotropic liquid crystal molecules in the second part 112 of the first polarizer 101 is perpendicular to an arrangement direction of the lyotropic liquid crystal molecules in the second part 112 of the second polarizer 102, and an arrangement direction of the lyotropic liquid crystal molecules in the first part 111 of the first polarizer 101 is perpendicular to an arrangement direction of the lyotropic liquid crystal molecules in the first part 111 of the second polarizer 102.

Embodiment 2

Figure 4:
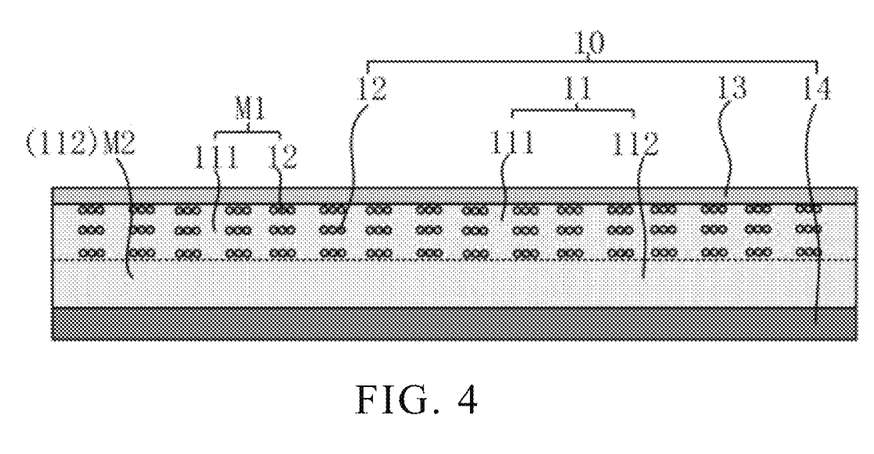
FIG. 4 is a schematic cross-sectional view of a polarizer provided in Embodiment 2 of the present disclosure.

FIG. 4 is a schematic cross-sectional view of a polarizer provided in Embodiment 2 of the present disclosure. Referring to FIG. 4, in a first aspect, Embodiment 2 of the present disclosure provides a polarizer 10. The polarizer 10 in Embodiment 2 includes a dichroic material 12 and a substrate 11 having an integrated structure. The substrate 11 having the integrated structure includes lyotropic liquid crystal molecules. A part of the substrate 11 in which the dichroic material 12 is dispersed is defined as a first part 111, and another part of the substrate 11 in which the dichroic material 12 is not dispersed is defined as a second part 112. The first part 111 is located on a side of the second part 112. The polarizer 10 includes a polarization part M1 and a compensation part M2. The first part 111 and the dichroic material 12 constitute the polarization part M1, and the second part 112 is the compensation part M2.

It should be noted that a structure of the polarizer 10 provided in Embodiment 2 of the present disclosure is similar to that of the polarizer 10 provided in Embodiment 1 of the present disclosure. The same parts will not be described again in Embodiment 2 of the present disclosure.

The polarizer 10 provided in Embodiment 2 of the present disclosure further includes a substrate 14, the compensation part M2 is disposed on a surface of the substrate 14, and the polarization part M1 is disposed on a side of the compensation part M2 facing away from the substrate 14.

In the polarizer 10 provided by the embodiments of the present disclosure, the substrate 14 serves as a carrier film layer of the compensation part M2 to facilitate the coating of the lyotropic liquid crystal layer composed of the second part 112 and the first part 111. In addition, the substrate 14 can also protect the side of the compensation part M2 facing away from the polarization part M1. Furthermore, since the polarizer 10 itself includes the substrate 14 as the carrier film layer, the polarizer 10 may be separated from the array substrate 21 or the color filter substrate 22 and manufactured separately. As a result, the range of application and design freedom of the polarizer 10 are improved.

Figure 5:
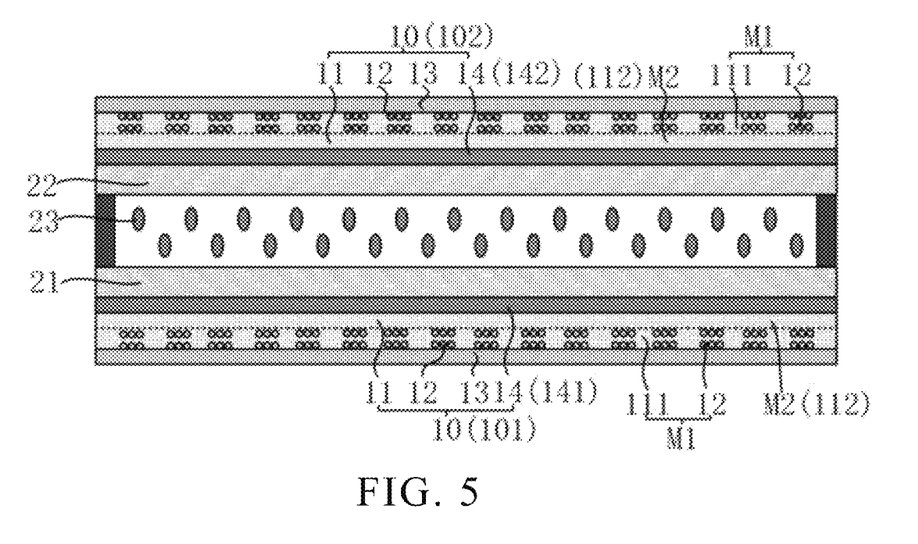
FIG. 5 is a schematic cross-sectional view of a display panel provided in Embodiment 2 of the present disclosure.

FIG. 5 is a schematic cross-sectional view of a display panel provided in Embodiment 2 of the present disclosure. Referring to FIG. 5, Embodiment 2 of the present disclosure also provides a display panel. The display panel includes at least one polarizer 10 as described in any one of the above. The display panel further includes an array substrate 21, a color filter substrate 22, and a liquid crystal layer 23 disposed between the array substrate 21 and the color filter substrate 22. The liquid crystal molecules in the liquid crystal layer 23 have birefringence characteristics. The at least one polarizer 10 includes a first polarizer 101 disposed on a side of the array substrate 21 facing away from the liquid crystal layer 23 and/or a second polarizer 102 disposed on a side of the color filter substrate 22 facing away from the liquid crystal layer 23. The polarization part M1 of the first polarizer 101 is disposed on a side of the compensation part M2 of the first polarizer 101 facing away from the array substrate 21. The polarization part M1 of the second polarizer 102 is disposed on a side of the compensation part M2 of the second polarizer 102 facing away from the color filter substrate 22.

It should be noted that a structure of the display panel provided in Embodiment 2 of the present disclosure is similar to that of the display panel provided in Embodiment 1 of the present disclosure. The same parts will not be described again in Embodiment 2 of the present disclosure.

In some embodiments of the present disclosure, the first polarizer 101 further includes a first substrate 141 disposed on a side of the array substrate 21 facing away from the liquid crystal layer 23. The compensation part M2 of the first polarizer 101 is disposed on a surface of the first substrate 141 facing away from the array substrate 21. The second polarizer 102 also includes a second substrate 142 disposed on a side of the color filter substrate 22 facing away from the liquid crystal layer 23, and the compensation part M2 of the second polarizer 102 is disposed on a surface of the second substrate 142 facing away from the color filter substrate 22.

In some embodiments of the present disclosure, the first substrate 141 of the first polarizer 101 is bonded to a surface of the array substrate 21 facing away from the liquid crystal layer 23 through optical glue, and the second substrate 142 of the second polarizer 102 is bonded to a surface of the color filter substrate 22 facing away from the liquid crystal layer 23 through optical glue.

In a third aspect, Embodiment 2 of the present disclosure also provides a manufacturing method used to manufacture the polarizer 10 described in any one of the above. Referring to FIGS. 3-5, the manufacturing method of the polarizer 10 includes a step S01 and a step S02.

The step S01 includes: providing a carrier film layer, and forming a substrate 11 having an integrated structure by directionally coating on the carrier film layer, where the substrate 11 having the integrated structure includes lyotropic liquid crystal molecules.

The step S02 includes: coating a dichroic material 12 on a surface of the substrate 11 having the integrated structure, and controlling a dispersion time of the dichroic material 12 to make the substrate 11 include a first part 111 in which the dichroic material 12 is dispersed and a second part 112 in which the dichroic material 12 is not dispersed.

The first part 111 is located on a side of the second part 112. The polarizer 10 includes a polarization part M1 and a compensation part M2. The first part 111 and the dichroic material 12 constitute the polarization part M1, and the second part 112 is the compensation part M2.

In some embodiments of the present disclosure, the carrier film layer is the first substrate 141 or the second substrate 142.

In some embodiments of the present disclosure, the dichroic material 12 includes iodide ions and complexes of iodide ions, a sum of thicknesses of the second part 112 and the first part 111 is greater than or equal to 15 μm, and the dispersion time of the dichroic material 12 ranges from 20 to 100 seconds.

In some embodiments of the present disclosure, a thickness of the first part 111 is greater than or equal to 7 μm, and a thickness of the second part 112 is greater than or equal to 0.5 μm.

In some embodiments of the present disclosure, a coating direction of the lyotropic liquid crystal layer is the same as a direction of a light absorption axis of the polarization part M1. Furthermore, during the process of manufacturing the first polarizer 101 and the second polarizer 102, an arrangement direction of the lyotropic liquid crystal molecules in the second part 112 of the first polarizer 101 is perpendicular to an arrangement direction of the lyotropic liquid crystal molecules in the second part 112 of the second polarizer 102, and an arrangement direction of the lyotropic liquid crystal molecules in the first part 111 of the first polarizer 101 is perpendicular to an arrangement direction of the lyotropic liquid crystal molecules in the first part 111 of the second polarizer 102.

In summary, the present disclosure provides polarizers, manufacturing methods thereof, and display panels. The polarizer includes the dichroic material and the substrate having the integrated structure. The substrate having the integrated structure includes lyotropic liquid crystal molecules. The part of the substrate in which the dichroic material is dispersed is the first part, and the part of the substrate in which the dichroic material is not dispersed is the second part. The first part is disposed on a side of the second part. The polarizer includes a polarization part and a compensation part. The first part and the dichroic material constitute the polarization part, and the second part is the compensation part. In the polarizer provided by the embodiment of the present disclosure, since the substrate includes lyotropic liquid crystal molecules, the substrate itself has a compensation function, so that the second part of the substrate without the dichroic material dispersed therein forms the compensation part. Since the dichroic material is dispersed in the first part of the substrate, the first part and the dichroic material form the polarization part. In addition, since the polarization part corresponds to the first part of the substrate, the compensation part corresponds to the second part of the substrate, and the first part and the second part are integrated, it can effectively avoid the problems of complicated manufacturing process and thick thickness of the polarizer caused by the need for separate film formation of the polarization part and the compensation part, thereby simplifying the manufacturing process of the polarizer and reducing the thickness of the polarizer.

The polarizers, manufacturing methods thereof, and the display panels provided by the embodiments of the present disclosure have been introduced in detail. Specific examples are used in this paper to illustrate the principles and implementation methods of the present disclosure. The description of the above embodiments is only for help understand the method and core ideas of the present disclosure. At the same time, for those skilled in the art, there will be changes in the specific implementation and application scope based on the ideas of the present disclosure. In summary, the content of this description should not be understood as a limitation of the present disclosure.

What is claimed is:

1. A polarizer, comprising:
    a substrate, being an integrated structure and comprising:
        a first part, comprising lyotropic liquid crystal molecules and dispersed with a dichroic material; and
        a second part, disposed on a side of the first part and comprising lyotropic liquid crystal molecules without the dichroic material,
    wherein the first part functions as a polarization part of the polarizer, and the second part functions as a compensation part of the polarizer.

2. The polarizer according to claim 1, wherein an arrangement direction of the lyotropic liquid crystal molecules in the second part is the same with an arrangement direction of the lyotropic liquid crystal molecules in the first part of the second polarizer.

3. The polarizer according to claim 2, wherein the dichroic material comprises iodide ions and complexes of iodide ions.

4. The polarizer according to claim 3, wherein a sum of a thickness of the second part and a thickness of the first part is greater than or equal to 15 μm.

5. The polarizer according to claim 4, wherein the thickness of the first part is greater than or equal to 7 μm, and the thickness of the second part is greater than or equal to 0.5 μm.

6. The polarizer according to claim 1, further comprising a support layer disposed on a side of the polarization part facing away from the compensation part.

7. The polarizer according to claim 1, further comprising a substrate disposed on a side of the compensation part facing away from the polarization part.

8. A display panel, comprising:
    an array substrate;
    a color filter substrate;
    a liquid crystal layer, disposed between the array substrate and the color filter substrate, and comprising liquid crystal molecules having birefringence characteristics; and
    a first polarizer, disposed on a side of the array substrate facing away from the liquid crystal layer; and/or
    a second polarizer, disposed on a side of the color filter substrate facing away from the liquid crystal layer,
    wherein each of the first polarizer and the second polarizer comprises:
        a substrate, being an integrated structure and comprising:
            a first part, comprising lyotropic liquid crystal molecules and dispersed with a dichroic material; and
            a second part, disposed on a side of the first part and comprising lyotropic liquid crystal molecules without the dichroic material,
        wherein the first part functions as a polarization part of the polarizer, and the second part functions as a compensation part of the polarizer; and
        wherein the polarization part of the first polarizer is disposed on a side of the compensation part of the first polarizer facing away from the array substrate, and the polarization part of the second polarizer is disposed on a side of the compensation part of the second polarizer facing away from the color filter substrate.

9. The display panel according to claim 8, wherein the display panel comprises the first polarizer and the second polarizer, a slow axis of the compensation part of the first polarizer is perpendicular to a slow axis of the compensation part of the second polarizer, a fast axis of the compensation part of the first polarizer is perpendicular to a fast axis of the compensation part of the second polarizer, and a transmission axis of the polarization part of the first polarizer is perpendicular to a transmission axis of the polarization part of the second polarizer.

10. The display panel according to claim 9, wherein the compensation part of the first polarizer is disposed on a surface of the array substrate facing away from the liquid crystal layer, and the compensation part of the second polarizer is disposed on a surface of the color filter substrate facing away from the liquid crystal layer.

11. The display panel according to claim 9, wherein the first polarizer further comprises a first substrate disposed on the side of the array substrate facing away from the liquid crystal layer, and the compensation part of the first polarizer is disposed on a surface of the first substrate facing away from the array substrate; and
    wherein the second polarizer further comprises a second substrate disposed on the side of the color filter substrate facing away from the liquid crystal layer, and the compensation part of the second polarizer is disposed on a surface of the second substrate facing away from the color filter substrate.

12. The display panel according to claim 8, wherein for each of the first polarizer and the second polarizer, an arrangement direction of the lyotropic liquid crystal molecules in the second part is the same with an arrangement direction of the lyotropic liquid crystal molecules in the first part of the second polarizer.

13. The display panel according to claim 12, wherein an arrangement direction of the lyotropic liquid crystal molecules in the second part of the first polarizer is perpendicular to an arrangement direction of the lyotropic liquid crystal molecules in the second part of the second polarizer, and an arrangement direction of the lyotropic liquid crystal molecules in the first part of the first polarizer is perpendicular to an arrangement direction of the lyotropic liquid crystal molecules in the first part of the second polarizer.

14. The display panel according to claim 12, wherein for each of the first polarizer and the second polarizer, the dichroic material comprises iodide ions and complexes of iodide ions.

15. The display panel according to claim 14, wherein for each of the first polarizer and the second polarizer, a sum of a thickness of the second part and a thickness of the first part is greater than or equal to 15 μm.

16. The display panel according to claim 15, wherein for each of the first polarizer and the second polarizer, the thickness of the first part is greater than or equal to 7 µm, and the thickness of the second part is greater than or equal to 0.5 µm.

17. The display panel according to claim 8, wherein each of the first polarizer and the second polarizer further comprises a support layer disposed on a side of the polarization part facing away from the compensation part.

\* \* \* \* \*